United States Patent [19]

Pfaendner et al.

[11] Patent Number: 5,126,427
[45] Date of Patent: Jun. 30, 1992

[54] SOLUBLE POLYARYLENE ETHER SULFONES

[75] Inventors: Rudolf Pfaendner, Rimbach/Odenwald, Fed. Rep. of Germany; Thomas Kainmüller, Basel, Switzerland; Kurt Hoffmann, Lautertal, Fed. Rep. of Germany; Friedrich Stockinger, Courtepin; Andreas Kramer, Düdingen, both of Switzerland

[73] Assignee: Ciba-Geigy Corporation, Ardsley, N.Y.

[21] Appl. No.: 665,492

[22] Filed: Mar. 6, 1991

[30] Foreign Application Priority Data

Mar. 12, 1990 [CH] Switzerland .................. 790/90

[51] Int. Cl.⁵ ................................ C08G 8/02
[52] U.S. Cl. .................... 528/128; 528/125; 528/126; 528/171; 528/174; 528/175; 528/219; 528/220
[58] Field of Search ............... 528/125, 126, 171, 172, 528/174, 175, 219, 220

[56] References Cited

U.S. PATENT DOCUMENTS 4,904,754  2/1990  Heinz et al. .................. 528/171
4,925,910  5/1990  Heinz ............................ 528/171

FOREIGN PATENT DOCUMENTS 194062   9/1986  European Pat. Off. .
3014230 10/1981  Fed. Rep. of Germany .

OTHER PUBLICATIONS

Chem. Abst. 96:7266g (1982).

Primary Examiner—Morton Foelak
Assistant Examiner—Shelley A. Wright
Attorney, Agent, or Firm—JoAnn Villamizar

[57] ABSTRACT

Polyarylene ether sulfones which have a reduced viscosity of 0.1 to 2.0 dl/g, measured at 25° C. in a 1% solution in N-methylpyrrolidone (NMP), and which contain, based on the total number of structural units present in the polyarylene ether sulfone resin, 99-1 mol % of a recurring structural unit of formula I

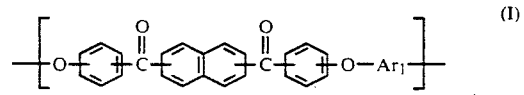

and 1-99 mol % of a recurring structural unit of formula II

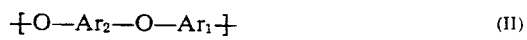

wherein the aromatic rings in the structural unit of formula I are unsubstituted or substituted by one or more $C_1$-$C_4$alkyl groups, $C_1$-$C_4$alkoxy groups or halogen atoms, $Ar_1$ is a radical of formula IIIa–IIIc

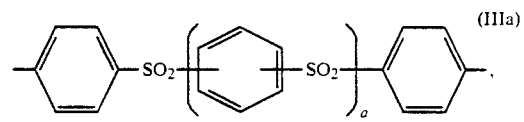

wherein a is 0 or 1,

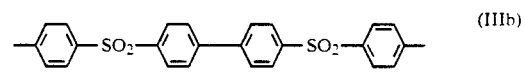

or

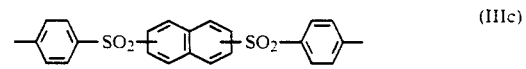

which radical is unsubstituted or substituted by one or more $C_1$-$C_4$alkyl groups, $C_1$-$C_4$alkoxy groups or halogen atoms, and $Ar_2$ is a radical of formula IVa–IVe

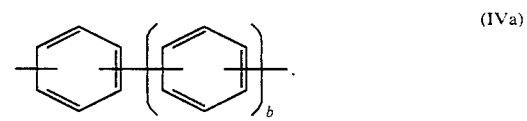

wherein b is 0 or 1

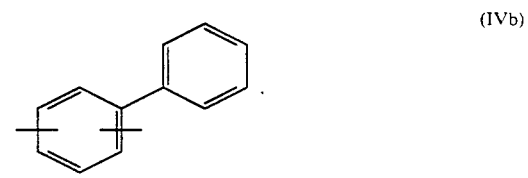

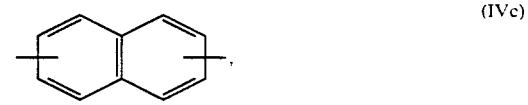

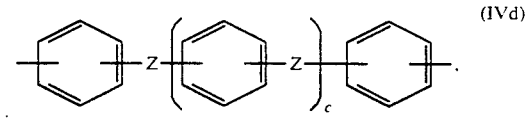

wherein c is 0 or 1

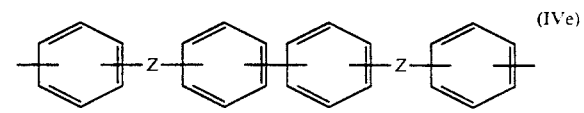

wherein Z is —CO—, —$SO_2$—, —SO—, —S—, —O—,

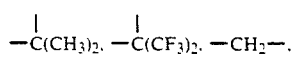
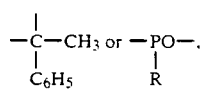
wherein R is methyl or phenyl, which radical is unsubstituted or substituted by one or more $C_1$-$C_4$alkyl groups, $C_1$-$C_4$alkoxy groups or halogen atoms, are soluble in customary organic solvents and can be processed from the solution to films or incorporated in other matrix resins.
10 Claims, No Drawings

SOLUBLE POLYARYLENE ETHER SULFONES

The present invention relates to polyarylene ether sulfones which are soluble in halogenated hydrocarbons and contain bis(benzoyl)naphthalene units, to their preparation, to the mouldings, coatings or sheets made therefrom, and to the use of said polyarylene ether sulfones for modifying matrix resins.

Polyarylene ether sulfones are industrial materials having very good mechanical and thermal properties which are normally insoluble in halogenated hydrocarbons or form unstable solutions.

Polyarylene ether sulfones having iso- and terephthalophenone units are disclosed, for example, in DE-OS 3 014 230. These keto group containing polyethers have enhanced solvent resistance.

Polyarylene ether sulfones containing 4,4'-bis(4-benzoyl)biphenylnaphthalene units and 2,6-bis(4-benzoyl)-naphthalene units are disclosed in EP-A 0 194 062. These polyarylene ether sulfones also have very good resistance to solvents.

For many utilities, especially for modifying duromer matrix resins, polyarylene ether sulfones are required which have enhanced solubility properties without any substantial reduction of the thermal properties, such as glass transition temperature.

Surprisingly, it has now been found that specific copolymers of polyarylene ether sulfones which contain bis(benzoyl)naphthalene units and which are modified with a specific diphenol or a specific dihalo compound are readily soluble in customary organic solvents, preferably in halogenated hydrocarbons, and form stable solutions.

Accordingly, the present invention relates to polyarylene ether sulfones which are soluble in halogenated hydrocarbons and have a reduced viscosity of 0.1 to 2.0 dl/g, measured at 25° C. in a 1% solution in N-methylpyrrolidone (NMP), which polyarylene ether sulfones contain, based on the total number of structural units present in the polyarylene ether sulfone resin, 99-1 mol % of a recurring structural unit of formula I

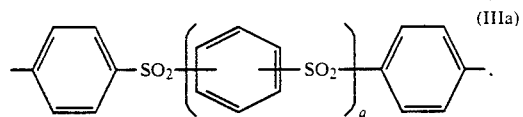

and 1-99 mol % of a recurring structural unit of formula II $$+O-Ar_2-O-Ar_1+ \quad (II),$$

wherein the aromatic rings in the structural unit of formula I are unsubstituted or substituted by one or more $C_1$-$C_4$alkyl groups, $C_1$-$C_4$alkoxy groups or halogen atoms, $Ar_1$ is a radical of formula IIIa-IIIc

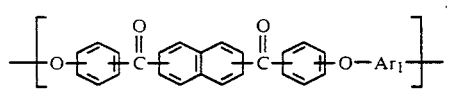

wherein a is 0 or 1,

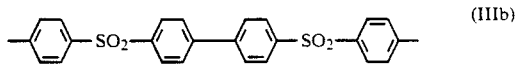

or

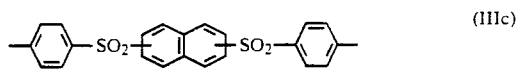

which radical is unsubstituted or substituted by one or more $C_1$-$C_4$alkyl groups, $C_1$-$C_4$alkoxy groups or halogen atoms, and $Ar_2$ is a radical of formula IVa-IVe

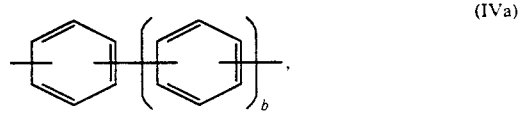

wherein b is 0 or 1,

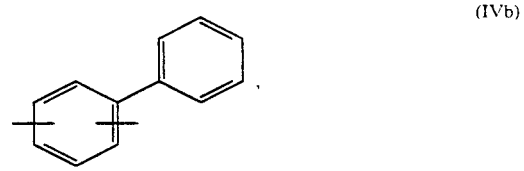

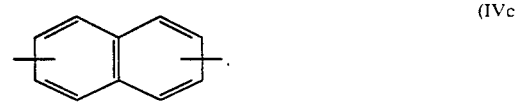

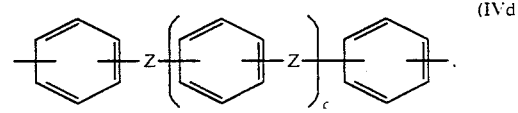

wherein c is 0 or 1,

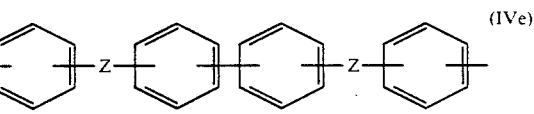

wherein Z is $-CO-$, $-SO_2-$, $-SO-$, $-S-$, $-O-$,

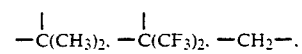

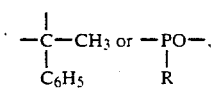

wherein R is methyl or phenyl, which radical is unsubstituted or substituted by one or more $C_1$-$C_4$alkyl groups, $C_1$-$C_4$alkoxy groups or halogen atoms.

The polyarylene ether sulfones of this invention preferably contain 5-95 mol % of a recurring structural unit of formula I and 95-5 mol % of a recurring structural unit of formula II.

The polyarylene ether sulfones of this invention preferably contain 5-75 mol % of a recurring structural unit of formula I and 95-25 mol % of a recurring structural unit of formula II.

The structural units of formulae I and II in the polyarylene ether sulfones of this invention are preferably unsubstituted.

The radical $Ar_1$ in the structural unit of formulae I and II is preferably an unsubstituted radical of formula IIIa, most preferably the radical

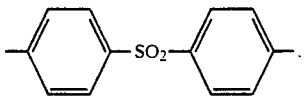

Especially preferred polyarylene ether sulfones of the invention contain 50-10 mol % of the recurring structural unit of the following formula

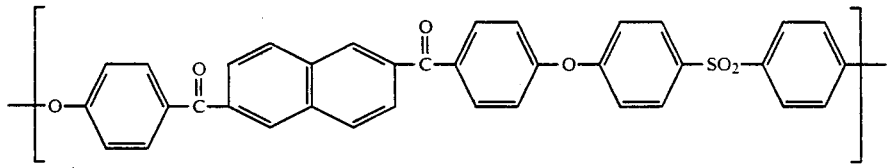

and 50-90 mol % of a recurring structural unit of the following formula

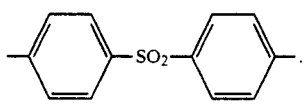

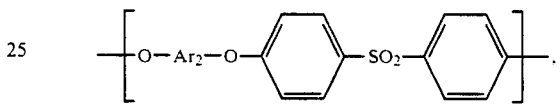

The radical $Ar_2$ in the structural unit of formula II is preferably a radical of formula

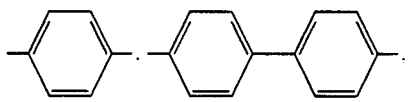

wherein $Ar_2$ is as defined above, preferably the radical

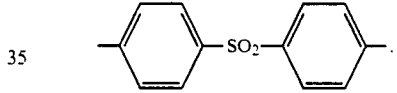

The polyarylene ether sulfones of this invention can be prepared by (a) polycondensing a mixture of a diphenol of formula V

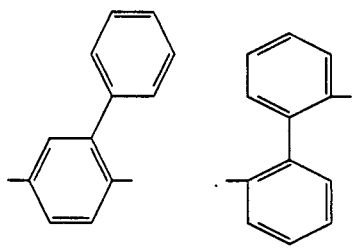

wherein the aromatic rings are unsubstituted or substituted by one or more $C_1$-$C_4$alkyl groups, $C_1$-$C_4$alkoxy groups or halogen atoms, and a diphenol of formula VI $$HO-Ar_2-OH \quad (VI).$$

present therein in an amount of up to 99 mol %, wherein $Ar_2$ is as defined above, in equimolar amounts, with a dihalo compound of formula VII $$Hal-Ar_1-Hal \quad (VII).$$

wherein $Ar_1$ is as defined above and Hal is a halogen atom, preferably a fluorine or chlorine atom, in the presence of alkali and in an aprotic solvent, or (b) polycondensing a mixture of a dihalo compound of formula VIII

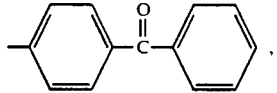
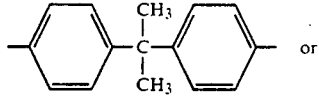
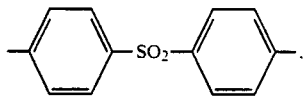

most preferably the radical wherein the aromatic rings are unsubstituted or substituted by one or more $C_1$-$C_4$alkyl groups, $C_1$-$C_4$alkoxy groups or halogen atoms, and Hal is a halogen atom, preferably a fluorine or chlorine atom, and a dihalo compound of formula VII present therein in an amount of 99 mol %, in equimolar amounts, with a diphenol compound of formula VI, in the presence of alkali and in an aprotic solvent, until the polyarylene ether sulfone has a reduced viscosity of 0.1 to 2.0 dl/g, measured in a 1% solution in NMP (1 g of polymer in 100 ml of NMP) at 25° C.

The preferred procedure comprises polycondensing a mixture of a diphenol of formula V and a diphenol of formula VI present therein in an amount of 95-5 mol %, preferably 75-5 mol %, in equimolar amounts, with a dihalo compound of formula VII, in the presence of alkali and in an aprotic solvent, until the resultant polyarylene ether sulfone preferably has a reduced viscosity of 0.15 to 1.8 dl/g, most preferably 0.2-1.5 dl/g.

In place of the diphenol of formula V or of formula VI it is also possible to use, in a manner known per se, the corresponding alkali metal and alkaline earth metal phenolates, for example the potassium and calcium phenolates.

By equimolar amounts are meant in the context of the process described above a molar ratio of the diphenol of formula VI or of the diphenols of formulae VIII and VII of 0.9 to 1.1. A molar ratio of 0.95 to 1.05 is preferred.

The alkali used in this process is ordinarily an alkali metal carbonate or alkaline earth metal carbonate such as sodium, potassium or calcium carbonate. But other alkaline reagents such as sodium hydroxide, potassium hydroxide or calcium hydroxide can also be used.

Polar aprotic solvents which can be used in the process of this invention for the preparation of the novel polyether resins are typically dimethyl sulfoxide, dimethyl acetamide, diethyl acetamide, tetramethylurea, N-methylcaprolactam, N-methylpyrrolidone and, preferably, diphenyl sulfone.

The reaction is conveniently carried out at elevated temperature, preferably at the reflux temperature of the solvent, i.e. in the temperature range up to ca. 350° C.

The concurrent use of an entrainer such as chlorobenzene, xylene or toluene is often expedient in order to be able to remove the water of reaction from the reaction mixture as an azeotrope.

The diphenols of formula V are known compounds. For example, 2,6-bis(4-hydroxybenzoyl)naphthalene and 2,7-bis(4-hydroxybenzoyl)naphthalene are disclosed in DE-OS 38 04 159, and chloro- or methyl-substituted 2,6-bis(4-hydroxybenzoyl)naphthalene are disclosed in U.S. Pat. No. 4,447,592 and 4,276,226.

The diphenols of formula V are also known compounds and most are commercially available. Typical examples of suitable divalent phenols of formula VI are hydroquinone, resorcinol, 4,4'-dihydroxybiphenyl, 2,5-dihydroxybiphenyl, 4,4'-dihydroxydiphenyl ether, 4,4'-dihydroxydiphenylsulfone, 4,4'-dihydroxy-3,3',5,5'-tetramethyldiphenylsulfone, 4,4'-dihydroxybenzophenone, 4,4'-dihydroxydiphenylmethane, 4,4'-dihydroxydiphenylthioether, 2,2-bis(4-hydroxyphenyl)propane or dihydroxynaphthalene.

The dihalo compounds of formula VII are likewise known. They are disclosed, for example, in DE-OS 30 14 230 and in EP-A-0 001 879. Suitable dihalo compounds of formula VII are typically 4,4'-dichlorodiphenylsulfone, 4,4'-difluorodiphenylsulfone, 1,4-bis(4-chlorophenylsulfonyl)benzene, 4,4'-bis(4-chlorophenylsulfonyl)biphenyl and 2,6-bis(4-chlorophenylsulfonyl)-naphthalene.

The dihalo compounds of formula VIII, such as 2,6- or 2,7-bis(p-fluorobenzoyl)naphthalene or 2,6- or 2,7-bis(p-chlorobenzoyl)naphthalene, are also known compounds and are disclosed, for example, in the already cited DE-OS 3 804 159 and in POLYMER, 1988, Volume 29, page 358 ff.

As mentioned at the outset, the polyarylene ether sulfones of this invention are soluble in customary organic solvents, preferably in halogenated, i.e. chlorinated or fluorinated, hydrocarbons, especially in chlorinated hydrocarbons such as methylene chloride, trichloromethane or dichloroethane. The novel polyarylene ether sulfones are also soluble in polar aprotic solvents such as N-methylpyrrolidone, N,N-dimethylformamide, dimethyl sulfoxide and sulfolane, or usually also in cyclic ethers such as tetrahydrofuran or dioxane, as well as in cyclohexanone. On account of their solubility, the polyarylene ether sulfones may with advantage be processed to films or incorporated in duromer or thermoplastic matrix systems.

The polyarylene ether sulfones can be used in the conventional manner for thermoplastics and processed, for example, to mouldings, sheets or coatings. The invention thus also relates to the objects made from the polyarylene ether resins, such as mouldings, coatings or sheets.

Prior to processing, for example as melt or, more particularly, as solution, the polyarylene ether sulfones may be blended with customary modifiers such as fillers, pigments, stabilisers or reinforcing agents such as carbon, boron, metal or glass fibres.

The polyarylene ether sulfones may also be used as matrix resins for the fabrication of fibrous composite systems, for which utility it is possible to use as reinforcing fibres the fibres conventionally used for reinforcing industrial materials. These fibres may be organic or inorganic fibres, natural fibres or synthetic fibres, and may be in the form of fibre bundles as oriented or non-oriented fibres or continuous filaments.

A further preferred utility of the polyarylene ether sulfones of this invention is, by virtue of their solubility, the modification of other matrix resins. Thus, for example, preferably concentrated solutions of these polymers in customary organic solvents will ordinarily be used for modifying duromer matrix resins with thermoplastics. It must be possible to remove the solvents rapidly after incorporation and they should therefore have as low evaporation points as possible.

The invention further relates to the use of the novel polyarylene ether sulfones for modifying thermoplastics and duromer matrix resins.

The following Examples illustrate the invention.

PREPARATION OF THE STARTING COMPOUNDS

EXAMPLE A 2,6-Bis(4-methoxybenzoyl)naphthalene

A stirred reactor comprising a 750 ml sulfonation flask, thermometer, condenser and nitrogen inlet is charged with 25.3 g (0.1 mol) of naphthalene-2,6-dicarbonyl dichloride and 32.4 g (0.2 mol) of anisole in 200 ml of nitrobenzene and, with stirring, 26.6 g (0.2 mol) of aluminium chloride are added over 15 minutes at 12°-18° C. The reaction mixture is thereafter allowed to react for 90 minutes at 40° C., then cooled to room temperature and thoroughly mixed with 1.5 liters of water containing HCl. The resultant suspension is diluted with 1.2 liters of N-methylpyrrolidone, and the mixture is heated to 130° C. The clear solution so obtained is cooled and the crystallised product is isolated by filtration. The filter residue is vacuum dried at 130° C., giving 25.9 g (65.4% of theory) of the desired product, which melts at 251° C.

Elemental analysis: calculated: C=78.77%; H=5.09%. found: C=78.68%; H=5.21%.

EXAMPLE B

2,6-Bis(4-hydroxybenzoyl)naphthalene

A 2.5 liter sulfonation flask fitted with thermometer, stirrer, condenser and nitrogen inlet is charged with 153 g (0.39 g mol) of 2,6-bis(4-methoxybenzoyl)naphthalene in 1350 ml of toluene and, with stirring, 282.7 g (2.12 mol) of aluminium chloride are added in portions over 15 minutes at 8° C. The reaction mixture is stirred for 4 hours at 75° C., then cooled to room temperature, and charged into 10 liters of water with vigorous stirring. The resultant suspension is filtered and the residue is vacuum dried at 130° C., giving 142.4 g (99.9% of theory) of a brownish powder which melts at 307° C. 67 g of the crude product are dissolved warm in 320.1 g 5% aqueous sodium hydroxide, and the solution is dried over Hyflo (filter aid based on diatomaceous earth (kieselguhr)) and the clear filtrate is charged to 2 liters of water containing 39.5 g of 37% of hydrochloric acid. The precipitated product is filtered, washed with water and vacuum dried at 130° C., giving 62.3 g (92.8% of theory) of the desired diphenol. The product melts at 307° C.

Elemental analysis: calculated: C=78.25%; H=4.38%. found: C=78.00%; H=4.36%.

The equivalent weight calculated by potentiometric titration is 185 (theory: 184.2).

EXAMPLE 1

Polyarylene ether sulfone copolymer of 2,6-bis(4-hydroxybenzoyl)naphthalene, 4,4'-dihydroxydiphenylsulfone and 4,4'-dichlorodiphenylsulfone In a round flask fitted with stirrer and inert gas inlet, a mixture of 9.27 g (0.0252 mol) of 2,6-bis(4-hydroxybenzoyl)naphthalene, 18.865 g (0.0752 mol) of 4,4'-dihydroxydiphenylsulfone, 87.53 g diphenylsulfone, 14.54 g (0.1052 mol) of potassium carbonate and 55 g of xylene is heated at a bath temperature of 200° C., and a mixture of xylene/water is removed by distillation. Towards the end of the distillation, a vacuum (2 mbar) is briefly applied. Then 28.73 g (0.1001 mol) of 4,4'-dichlorodiphenylsulfone are added to the reaction mixture, the temperature is raised to 275° C. over 25 minutes and kept for 1 hour. Thereafter the temperature is raised to 275° C. and then to 300° C. This temperature is kept for 3 hours, whereupon the reaction mixture becomes increasingly viscous.

After cooling, the reaction mixture is removed from the flask, pulverised, treated with dilute acetic acid and extracted first with water and then with acetone. The polymer is then dissolved in methylene chloride and the solution is filtered to remove a minor amount of insoluble material, and the product is precipitated with isopropanol. The so purified polymer is then dried in a vacuum drier in the temperature range up to 240° C. A polyarylene ether sulfone so obtained has a reduced viscosity (1 g of polymer in 100 ml of NMP at 25° C.) of 0.42 dl/g. The solubility of the polymer is more than 20% in methylene chloride and more than 25% in cyclohexanone after heating to 100° C. The glass transition temperature measured by differential scanning calorimetry (DSC) is ca. 223° C.

EXAMPLES 2-5

The Examples listed in the following Table for the preparation of polyarylene ether sulfone copolymers are carried out as described in Example 1.

TABLE

| | Polyarylene ether sulfone copolymers | | | | |
|---|---|---|---|---|---|
| Ex. | Composition | Reaction conditions | red. visc. [dl/g] | Glass transition temp. (DSC) [°C.] | Solubility in $CH_2Cl_2$ [%] |
| 2 | 2,6-bis(4-hydroxybenzoyl)naphthalene (0.0402 mol) | 1 h/250° C. | 0.42 | 228 | >25 |
| | 4,4'-dihydroxydiphenylsulfone (0.3610 mol) | 1 h/275° C. | | | |
| | 4,4'-dichlorodiphenylsulfone (0.4000 mol) | 4 h 15 min/280° C. | | | |
| 3 | 2,6-bis(4-hydroxybenzoyl)naphthalene (0.0250 mol) | 1 h/222° C. | 0.79 | 222 | >25 |
| | 4,4'-dihydroxydiphenylsulfone (0.0252 mol) | 1 h/250° C. | | | |
| | 4,4'-dichlorodiphenylsulfone (0.0501 mol) | 2 h 30 min/283° C. | | | |
| 4 | 2,6-bis(4-hydroxybenzoyl)naphthalene (0.0126 mol) | 1 h/225° C. | 0.39 | 205 | >25 |
| | 4,4'-dihydroxydiphenylsulfone (0.0253 mol) | 1 h/246° C. | | | |
| | 4,4'-dihydroxybiphenyl (0.0127 mol) | 4 h/285° C. | | | |
| | 4,4'-dichlorodiphenylsulfone (0.0501 mol) | | | | |
| 5 | 2,6-bis(4-hydroxybenzoyl)naphthalene (0.0050 mol) | 1 h/222° C. | 0.46 | 214 | >25 |
| | 4,4'-dihydroxydiphenylsulfone (0.0406 mol) | 1 h/247° C. | | | |
| | 4,4'-dihydroxybenzophenone (0.0050 mol) | 1 h 30 min/284° C. | | | |
| | 4,4'-dichlorodiphenylsulfone | | | | |

| | Polyarylene ether sulfone copolymers | | | |
|---|---|---|---|---|
| Ex. | Composition | Reaction conditions | red. visc. [dl/g] | Glass transition temp. (DSC) [°C] | Solubility in CH$_2$Cl$_2$ [%] |
| | (0.0502 mol) | | | | |

EXAMPLE 6

A polyether sulfone copolymer prepared according to Example 2 is added in the form of a 30 parts by weight solution in methylene chloride to a mixture consisting of 50 parts by weight of tetraglycidyl diaminodiphenylmethane and 50 parts by weight of triglycidyl-p-aminophenol and the solvent is removed under vacuum. After addition of 50 parts by weight of p-diaminodiphenylsulfone the mixture is cured in a mould for 2 hours at 210° C. Test specimens are cut from the sheet so obtained and the flexural strength, edge fibre elongation according to ISO 178, as well as the fracture toughness by bend notch according to ASTM E 399 are determined.

flexural strength = 173N/mm$^2$
edge fibre elongation = 6.6%
fracture toughness = 321 J/m$^2$.

What is claimed is:

1. A polyarylene ether sulfone which is soluble in halogenated hydrocarbons and has a reduced viscosity of 0.1 to 2.0 dl/g, measured at 25° C. in a 1% solution in N-methylpyrrolidone (NMP), which polyarylene ether sulfone contains, based on the total number of structural units present in the polyarylene ether sulfone resin, 99-1 mol % of a recurring structural unit of formula I

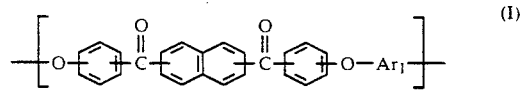

and 1-99 mol % of a recurring structural unit of formula II

wherein the aromatic rings in the structural unit of formula I are unsubstituted or substituted by one or more C$_1$-C$_4$alkyl groups, C$_1$-C$_4$alkoxy groups or halogen atoms, Ar$_1$ is a radical of formula IIIa-IIIc

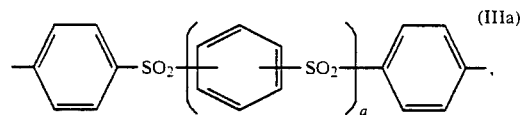

wherein a is 0 or 1,

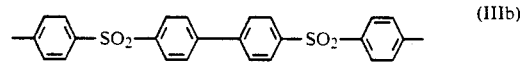

or

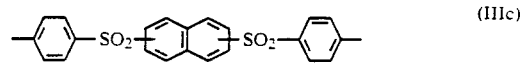

which radical is unsubstituted or substituted by one or more C$_1$-C$_4$alkyl groups, C$_1$-C$_4$alkoxy groups or halogen atoms, and Ar$_2$ is a radical of formula IVa-IVe

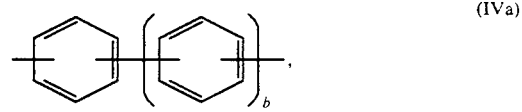

wherein b is 0 or 1,

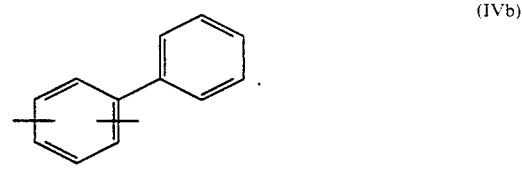

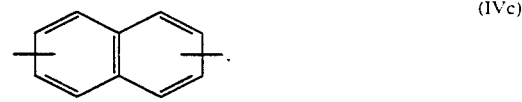

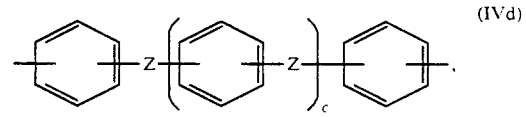

wherein c is 0 or 1,

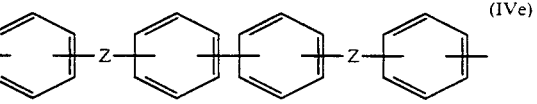

wherein Z is —CO—, —SO$_2$—, —SO—, —S—, —O—,

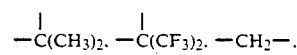

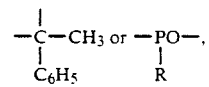

wherein R is methyl or phenyl, which radical is unsubstituted or substituted by one or more C$_1$-C$_4$alkyl groups, C$_1$-C$_4$alkoxy groups or halogen atoms.

2. A polyarylene ether sulfone according to claim 1, which contains 95-5 mol % of a recurring structural unit of formula I and 5-95 mol % of a recurring structural unit of formula II.

3. A polyarylene ether sulfone according to claim 1, which contains 75-5 mol % of a recurring structural unit of formula I and 25-95 mol % of a recurring structural unit of formula II.

4. A polyarylene ether sulfone according to claim 1, which contains unsubstituted structural units of formulae I and II.

5. A polyarylene ether sulfone according to claim 1, wherein $Ar_1$ in the structural unit of formulae I and II is an unsubstituted radical of formula IIIa.

6. A polyarylene ether sulfone according to claim 1, wherein $Ar_1$ in the structural unit of formulae I and II is the radical

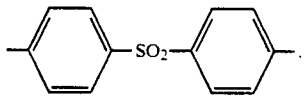

7. A polyarylene ether sulfone according to claim 1, wherein $Ar_1$ in the structural unit of formula II is a radical of formula

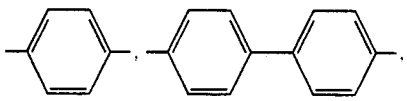

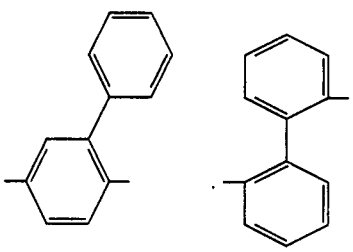

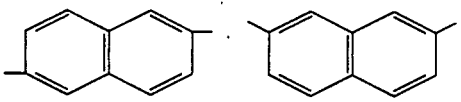

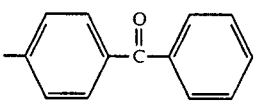

or

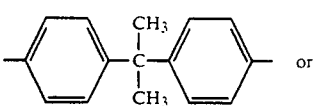

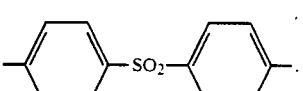

8. A polyarylene ether sulfone according to claim 1, wherein $Ar_2$ in the structural unit of formula II is the radical

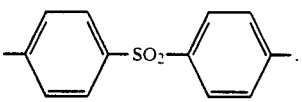

9. A process for the preparation of a polyarylene ether sulfone according to claim 1, which comprises
(a) polycondensing a mixture of a diphenol of formula V

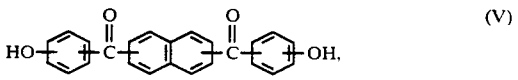

wherein the aromatic rings are unsubstituted or substituted by one or more $C_1$-$C_4$alkyl groups, $C_1$-$C_4$alkoxy groups or halogen atoms, and a diphenol of formula VI $$HO-Ar_2-OH \qquad (VI).$$

present therein in an amount of up to 99 mol %, wherein $Ar_2$ is as defined in claim 1, in equimolar amounts, with a dihalocompound of formula VII

wherein $Ar_1$ is as defined in claim 1, and Hal is a halogen atom, preferably a fluorine or chlorine atom, in the presence of alkali and in an aprotic solvent, or
(b) polycondensing a mixture of a dihalo compound of formula VIII

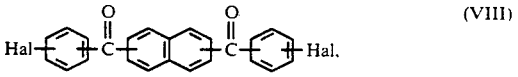

wherein the aromatic rings are unsubstituted or substituted by one or more $C_1$-$C_4$alkyl groups, $C_1$-$C_4$alkoxy groups or halogen atoms, and Hal is a halogen atom, preferably a fluorine or chlorine atom, and a dihalo compound of formula VII present therein in an amount of 99 mol %, in equimolar amounts, with a diphenol compound of formula VI, in the presence of alkali and in an aprotic solvent, until the polyarylene ether sulfone has a reduced viscosity of 0.1 to 2.0 dl/g, measured in a 1% solution in NMP at 25° C.

10. A moulding, coating or sheet containing a polyarylene ether sulfone according to claim 1.

* * * * *